(12) United States Patent
Petelka

(10) Patent No.: US 7,703,833 B2
(45) Date of Patent: Apr. 27, 2010

(54) SIDE ROLL UP TARPAULIN SYSTEM FOR A FLATBED TRAILER

(75) Inventor: Brian W. Petelka, Carlisle (CA)

(73) Assignee: Petelka Investments Ltd., Carlisle, Ontario (CA)

( * ) Notice: Subject to any disclaimer, the term of this patent is extended or adjusted under 35 U.S.C. 154(b) by 0 days.

(21) Appl. No.: 12/044,560

(22) Filed: Mar. 7, 2008

(65) Prior Publication Data

US 2008/0231069 A1    Sep. 25, 2008

(30) Foreign Application Priority Data

Mar. 22, 2007    (CA) .................................... 2582619

(51) Int. Cl.
*B60P 7/04* (2006.01)

(52) U.S. Cl. ........................................................ 296/98

(58) Field of Classification Search .................. 296/98, 296/100.14, 141, 186.2
See application file for complete search history.

(56) References Cited

U.S. PATENT DOCUMENTS 5,002,328 A * 3/1991 Michel .......................... 296/98
5,211,440 A * 5/1993 Cramaro ....................... 296/98
6,199,935 B1 * 3/2001 Waltz et al. ................... 296/98
6,779,828 B1   8/2004 Poyntz
6,926,337 B2   8/2005 Poyntz
2004/0239142 A1   12/2004 Poyntz

* cited by examiner

Primary Examiner—Dennis H Pedder
(74) Attorney, Agent, or Firm—Nixon Peabody LLP; Jeffrey L. Costellia

(57) ABSTRACT

The invention relates to a side lifting/closing tarpaulin system for a flatbed trailer, the trailer having an elongated platform having front and rear ends, sides, a pair of bulkheads of similar construction extending upwardly from the platform at its front and rear ends, and a plurality of tarpaulin supporting beams extending laterally across the platform, and longitudinally along the platform. The system comprises a pair of pivoting arms, each arm supported by a corresponding bulkhead. The arms are pivotable, in corresponding fashion, with respect to a side of the platform, between an upper, open orientation and a lower, closed orientation. Each arm is provided with an elongated slot along a longitudinal axis of the arm. Each arm is mounted relative to the bulkhead such that the pivot sits within the slot in a manner that permits longitudinal movement of the arm relative to the pivot. There is further provided mechanical drive means to rotate the roller to roll or unroll the tarpaulin thus causing movement of the arms between the open and closed positions.

9 Claims, 5 Drawing Sheets

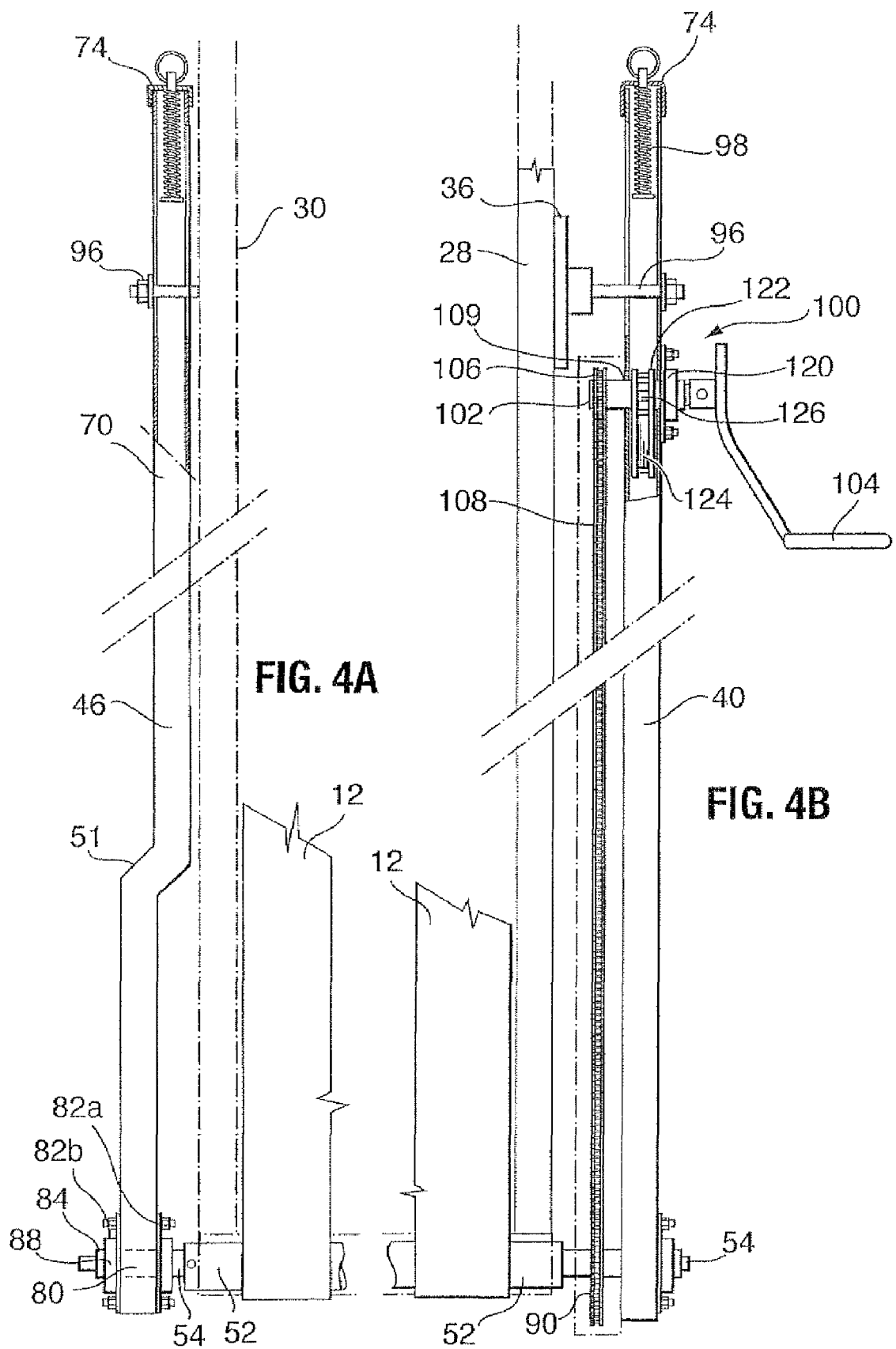

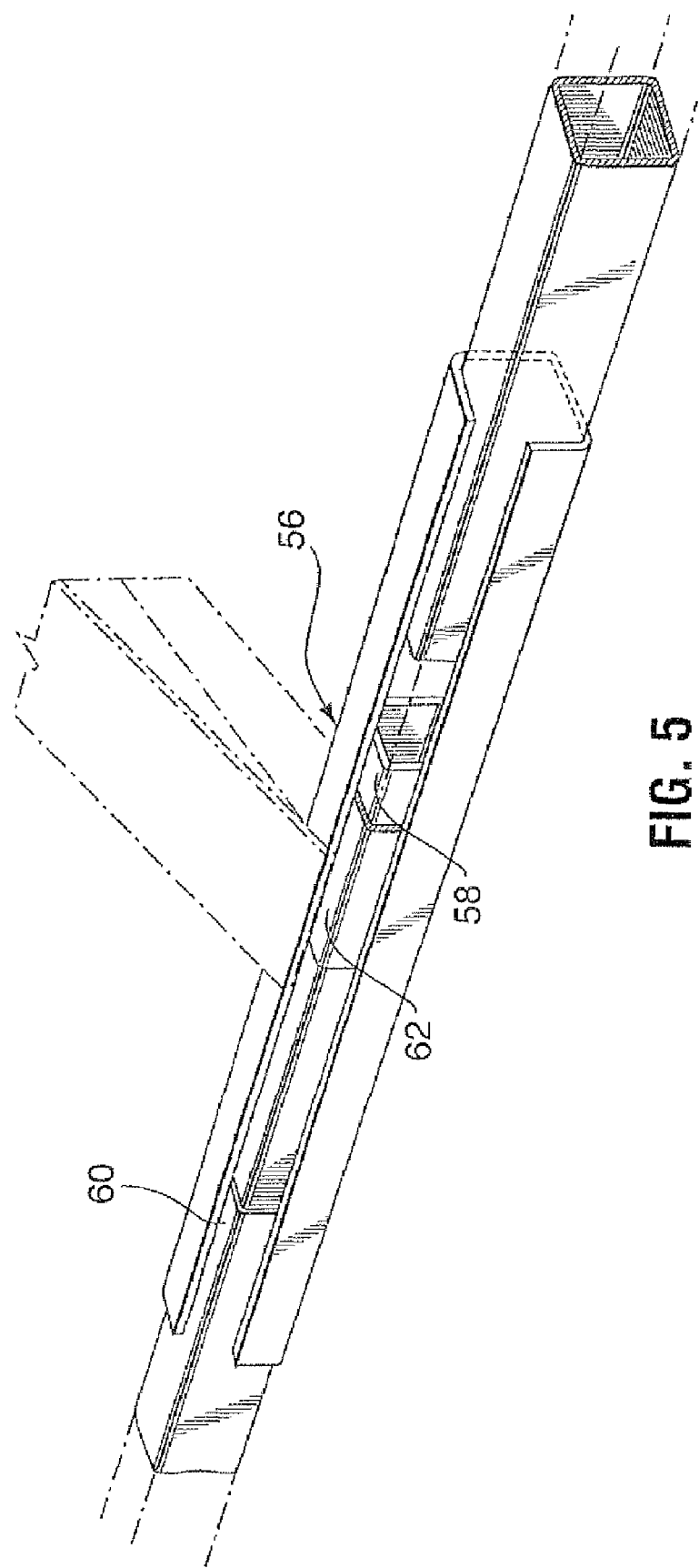

SIDE ROLL UP TARPAULIN SYSTEM FOR A FLATBED TRAILER

RELATED APPLICATION

This application claims the benefit under Title 35, U.S.C., S.119(e) of Canadian application No. 2,582,619 filed on Mar. 22, 2007.

FIELD OF THE INVENTION

The present invention relates to a side roll up tarpaulin system for use with semi-flatbed trailers, truck bodies or utility tag along trailers. As well the system can be adapted to open top trailers or truck bodies for the purpose of covering or uncovering loads.

BACKGROUND OF THE INVENTION

The transportation of heavy cargo is often done by truck and transport trailers. In some cases, it is feasible to transport the goods within a conventional closed trailer, accessible from the rear doors. However, for some cargo it is required to have the trailer accessible from the sides. For example, in the transport of sod, the cargo cannot be efficiently loaded from the rear. Thus, flatbed trucks wherein the cargo can be loaded and unloaded from the sides are often used in the transport of such types of cargo.

For the transport of sod, in particular, it is mandated that the cargo loaded flatbed be enclosed so as to prevent spillage of the sod. In many cases this is done with a tarpaulin system that spans the length of the flatbed trailer, from front to rear between bulkheads at either end and that is retractable to allow for the sides to be open for loading and unloading and closed for transport. Thus there is a need for a system to move the tarpaulin system effectively and efficiently between the open and closed positions.

Many manual systems have been devised and implemented, there are known deficiencies. For example, some systems require the operator or driver to climb up on top of the load to release and/or secure the tarpaulin at the top and then climb down to secure and/or release the tarpaulin at the bottom. This results in increased risk of injury as well as inefficiencies in the movement of the tarp.

Other systems attempt to employ a remotely activated means of moving the tarpaulin between the open and closed positions. However, many of those incorporate expensive of bulky constructions or do not allow for the tarp to be held in an intermediate position between the fully open and fully closed positions. In one such construction, of Poyntz (U.S. Pat. No. 6,779,828) the control arm located at the front and rear bulkheads to open and close the tarpaulin is a telescoping arrangement.

SUMMARY OF THE INVENTION

An object of the invention is to provide an improved side roll up tarpaulin system for use with a flatbed truck, trailer or open top trailer According to one aspect of the invention, there is provided a side lifting/closing tarpaulin system for a flatbed trailer, the trailer having an elongated platform having front and rear ends, sides, a pair of bulkheads of similar construction extending upwardly from the platform at its front and rear ends, and a plurality of tarpaulin supporting beams extending laterally across the platform, and longitudinally along the platform. The system comprises a pair of pivoting arms, each arm supported by a corresponding bulkhead. The arms are pivotable, in corresponding fashion, with respect to a side of the platform, between an upper, open orientation and a lower, closed orientation. Each arm is pivotable in a plane parallel to that of the corresponding bulkhead about a pivot mounted to the bulkhead. There is further provided a roller bar extending between and supported by an outer end of each of the arms. The tarpaulin is supported in rolled fashion on the roller bar when the arms are in upper, open orientation, opening the corresponding side of a trailer and being supported by the support beams. The tarpaulin is rolled off the bar to enclose the corresponding side when the arms are in lower, closed position. Each arm is provided with an elongated slot along a longitudinal axis of the arm. Each arm is mounted relative to the bulkhead such that the pivot sits within the slot in a manner that permits longitudinal movement of the arm relative to the pivot. There is further provided mechanical drive means to rotate the roller to roll or unroll the tarpaulin thus causing movement of the arms between the open and closed positions.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the present patent specification as a whole.

BRIEF DESCRIPTION OF THE DRAWINGS

These and other advantages of the invention will become apparent upon reading the following detailed description and upon referring to the drawings in which:

FIGS. 4a and 4b are plan views, partially cut away, of the arms of the present invention;

FIG. 5 is a partially exploded view of the top rail of the present invention;

Figure 1:
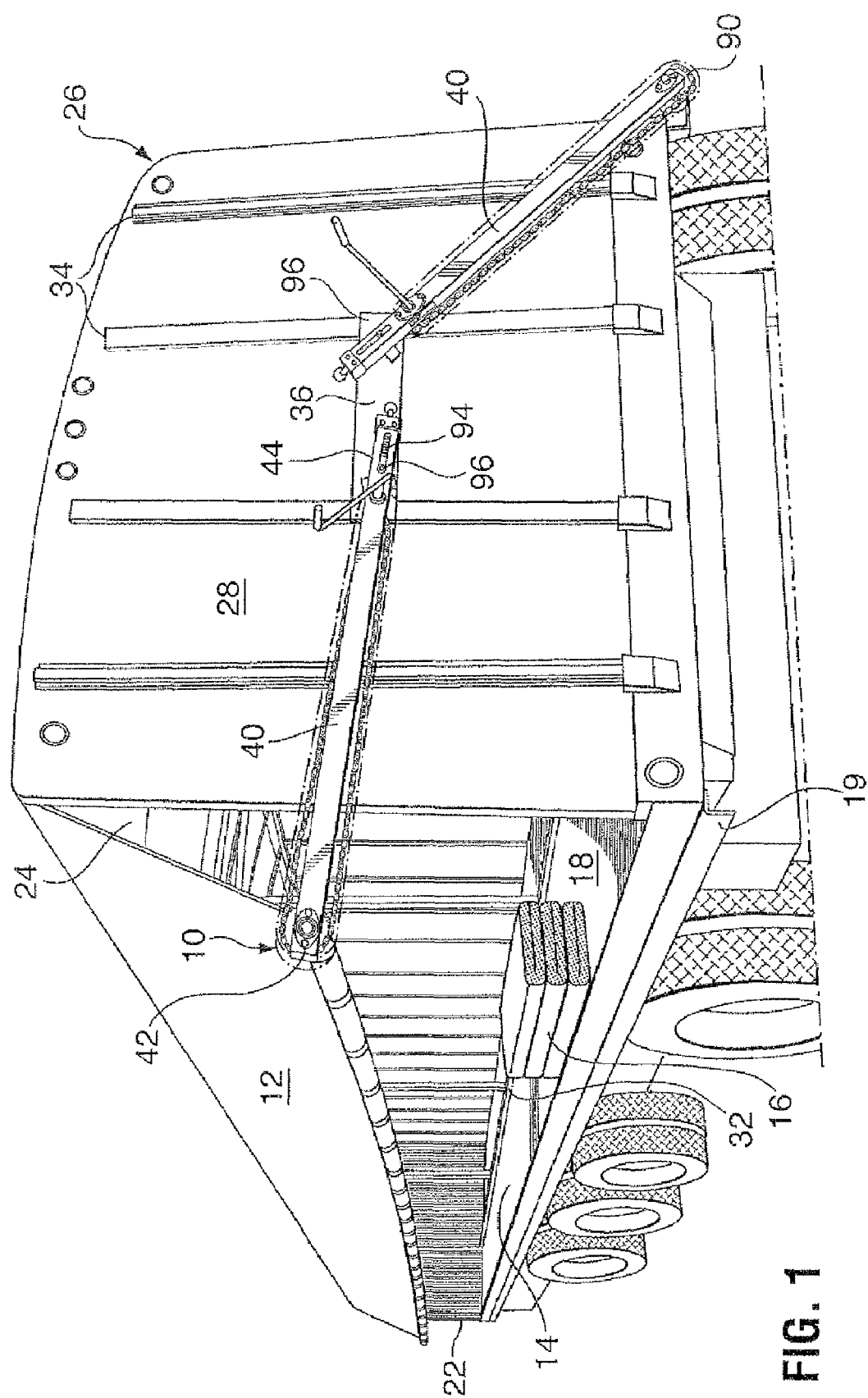
FIG. 1 is perspective view of the system of the invention mounted on a trailer.

The present invention will now be described by way of a non-limiting description of certain detailed embodiments.

DETAILED DESCRIPTION OF THE PREFERRED EMBODIMENTS

In the following description, similar features in the drawings have been given identical reference numerals where appropriate. All dimensions described or suggested herein are intended solely to illustrate an embodiment. These dimensions are not intended to limit the scope of the invention that may depart from these dimensions.

FIG. 1 illustrates a system 10 for raising and lowering a tarpaulin 12 between an open and closed position mounted on a flatbed trailer 14 of a type suitable for carrying cargo, such as sod 16 or other cargo like wood, building supplies or the like that is required to be enclosed while being transported by flatbed trailer. The trailer 14 is of conventional design with an elongated platform 18 lying horizontally between a front end 20 and a rear end 22. The trailer 14 is further defined by sides 24, 26 and front bulkhead 28 and rear bulkhead 30. There is provided a plurality of support beams 32 extending laterally across the platform 18 and evenly spaced longitudinally along the length of the platform 18. The bulkheads 28, 30 include support or brace beams 34. There is further provided a mounting plate 36 mounted to the beams 34 of the front bulkhead 28 to accommodate the system 10. On the bottom of the platform 18 is a longitudinally extending downwardly facing flange 19 which creates a lip on the bottom edge of the platform 18 along its length.

Figure 3:
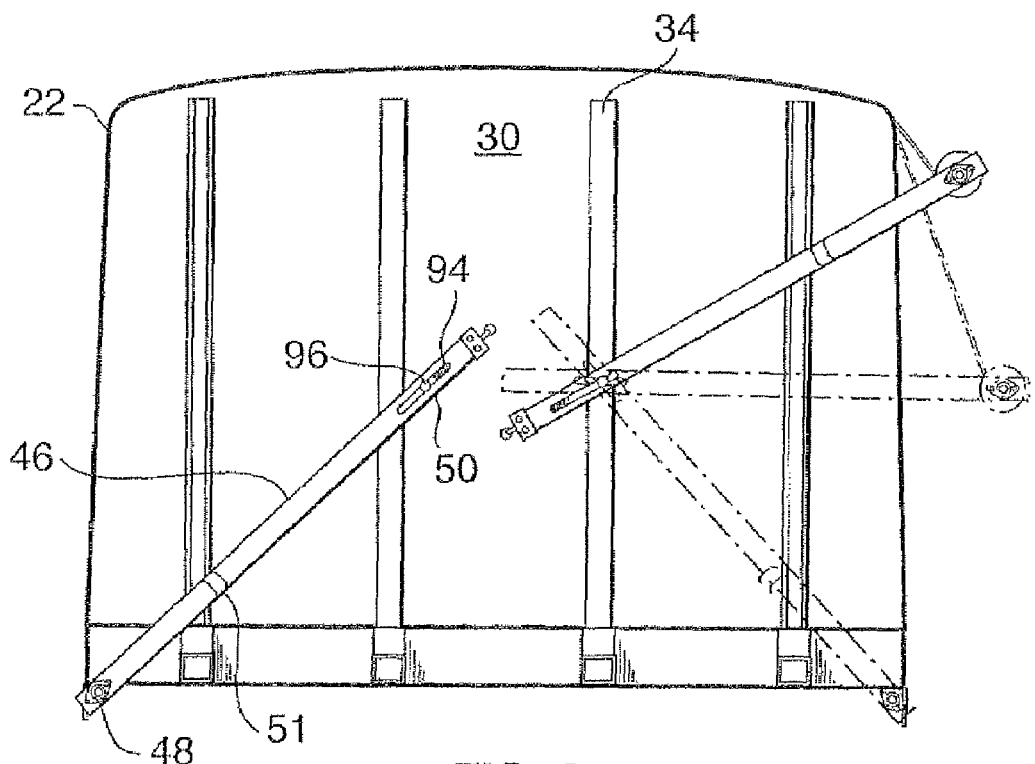
FIG. 3 is an elevation view of the rear bulkhead with the arm of the invention mounted thereto.
Figure 6A:
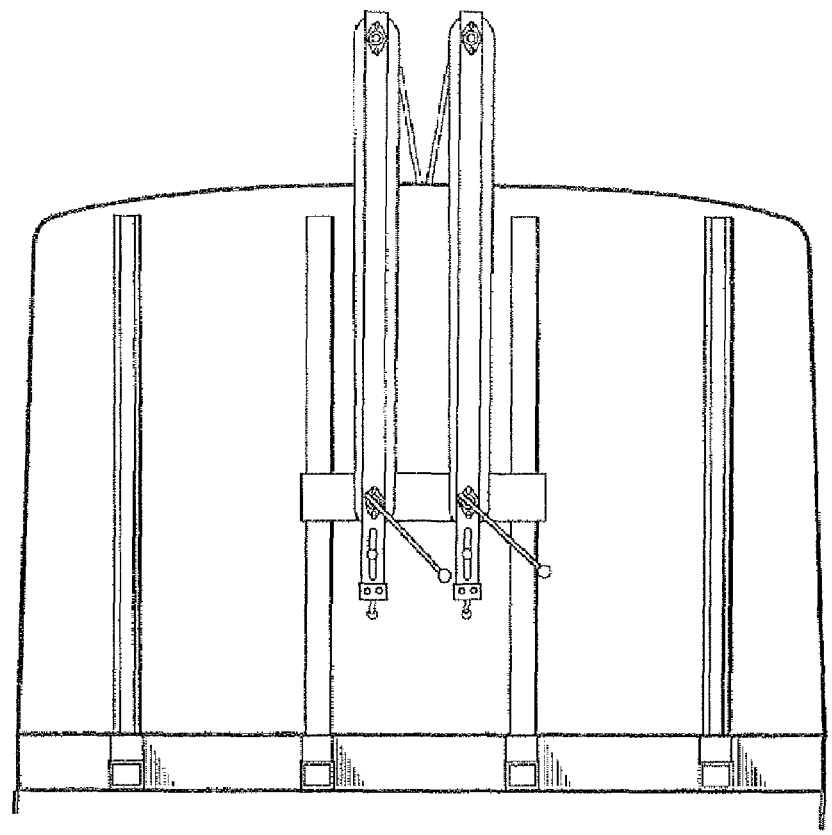
FIGS. 6a and 6b show plan views of the system in place in alternate tarping arrangements.
Figure 6B:
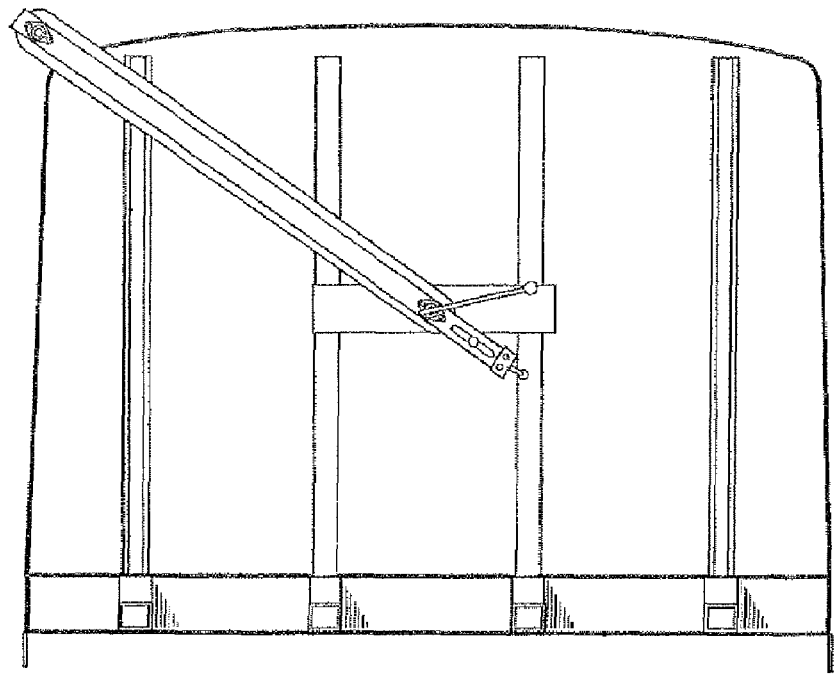

The system comprises a first arm 40 located at the front end 20 of the platform 18, and is preferably mounted to the front bulkhead 28. The first arm 40 comprises a tarp end 42 and a pivot end 44. As shown in FIG. 3, a second arm 46 is located at the rear end 22 of the platform 18 and is preferably mounted to the rear bulkhead 30. The second arm 46 also comprises a tarp end 48 and a pivot end 50. As illustrated in the drawings, the second arm 46 located at the rear end 22 comprises a straight arm design or off-set or jog 51 along its length. This is to accommodate the optional design of the rear bulkhead 30 set ahead or shaped and sized to accommodate a forklift or the like often mounted to the trailer 14. Both the first and second arms 40, 46 are rigid and of a fixed length.

The trailer 14 is further fitted with a tarp roller 52 that carries the tarpaulin 12 on a spindle 54. The tarpaulin 12 on the roller 52 is supported in the open position, in which the tarpaulin 12 is rolled on the roller 52, by a top rail 56. The top rail 56 can be any fixed length to match the length of the platform 18 or can be adjustable in length by being of a telescoping arrangement. As shown in FIG. 5, the rail 56 may be comprised of an inner tube 58, a middle tube 60 and a four sided outer tube 62 whereby the top & side outer edges are cut back to allow the tarpaulin to lay flush and to reduce the wear on the tarpaulin as it passes over the edges of the rail 56 The tubes can be made of steel, aluminum or other suitable material for the load. In one embodiment of the invention, the rail 56 has a square cross-section and the inner 58, middle 60 and outer 62 tubes are 1.5"×1.5", 2.0"×2.0" and 2.5"×2.5" respectively. Those skilled in the art will appreciate that other dimensions may be used but it is preferred that the relative dimensions remain essentially the same. In this way, the inner 58, middle 60 and outer 62 tubes can be moved relative to one another in conventional fashion in order to adjust the length of the top rail to match different lengths of platform 18 and accommodate different lengths of spindle 54 and roller 52.

With reference to FIGS. 4a and 4b, the assembly of arms 40 and 46 will be discussed in greater detail. The arms 40, 46 each comprise a beam 70 and end caps 74 at the tarp end 42, 48 and pivot end 44, 50. The caps can be bolted on or affixed in any similar means but are preferably not permanently attached. At the tarp ends 42, 48 the arms 40, 46 each comprise a keyway 80 flanked by flanges 82a and 82b to accommodate shaft 84 and bearing. There is also a collar 88 to ensure a proper fit. On the first arm 40, the shaft 84 rotationally carries chain wheel 90. On both the first 40 and second 46 arms, the shaft 84 rotationally mates with spindle 54 at front and rear ends of the roller 52 in order to rotate the roller 52 to roll and unroll the tarpaulin 12. This will be described in greater detail in the operation of the system.

At the pivot ends 44, 50, the arms 40, 46 have an elongated slot 94 along the longitudinal axis of the arm. The slot 94 is of sufficient width to accommodate a shaft 96 that is mounted on the mounting plate 36 and extends laterally outward from the front bulkhead 28. At the rear bulkhead 30, the shaft 96 may be mounted to mounting plate (not shown) or directly to the bulkhead 30 or brace 34. In this way, the arms 40, 46 are free to cam or float along the length of the slot 94 by rotating over the shaft 96 as the arms 40, 46 move through an arc of rotation in a plane parallel to the bulkheads.

There is further provided housed within the slot 94 a biasing means such as a spring 98 as shown. Other suitable biasing means such as a spring plate, coil or helix may be used. The spring 98 is preferably a compression spring and is mounted between a plate and the end cap 74. The spring 98 is placed on a rod that has been welded to plate 99 and the plate and spring are then placed within the arm 40 resting on a mounting bolt of the arm assembly. In one embodiment, the end cap 74, having an aperture in its center, is placed over the rod and held in place, for example with a washer and retainer ring. The compression force of the spring 98 acts upon the end cap 74, and consequently the arm, in such a way as to pull the arm upward and inward relative to the side 24 when the arm 40 is in the lower position ensuring that the unrolled tarpaulin locks under the flange 19. When the arms are being raised, the spring provides a tension on the roller to ensure a smoother transition to the upper position.

Looking specifically at the first arm 40, the pivot end 44 will be discussed in greater detail. The pivot end 44 comprises the elongated slot 94 which accommodates the shaft 96 and further houses the spring 98. There is also a control means 100 for rolling and unrolling the tarpaulin 12. As illustrated in, the control means 100 may be a crank shaft 102 that can be turned manually by a handle 104 by an operator (not shown). The shaft 102 further holds a chain drive wheel 106 which, with the chain wheel 90, carries a chain 108. As seen in the figures, the chain 108 is protected by a chain guard 109. The handle 104 is used to rotate the chain drive wheel 106 thus rotating the chain 108 causing rotation of the chain wheel 90. The rotation is then transferred to tarp roller 52 causing the tarp 12 to be rolled or unrolled depending on the direction of the rotation. The shaft 102 is mounted to the beam 34 of the front bulkhead 28 and passes through a bearing keyway 109 in the arm 40.

Alternatively, the rotation of the shaft 102 may be caused by motorized means such as a electric, pneumatic or hydraulic drive controlled by a user interface 110. The motorized control can be selectively disconnected or bypassed to allow the operator to use the manual control in the event that the motorized control is either not available or not desirable.

Further housed within the first arm 40 is the locking mechanism 120. The locking mechanism 120 comprises a ratchet 122 with a double lever pawl 124 that is designed to automatically engage the ratchet teeth 126 and stop rotation in one direction upon cessation of rotational force but allow free movement in the opposite direction. The lever 124 can be manually reversed however in order to selectively stop rotation in the other direction. In this way, the movement of the arms 40, 46 can be automatically locked as the arms are being raised and rotation is ceased. As the arms are being lowered the rotation can be selectively stopped by manually engaging the lever 124 into its locked position.

The operation of the system 10 will now be described with reference to the unrolling and lowering of the tarpaulin 12 from the open position to the closed position in which the side 24 of the trailer 14 is enclosed, thus securing the cargo 16. It will be understood that the raising and rolling of the tarpaulin 12 is essentially the reverse operation, although the differences, such as the operation of the locking ratchet 122 during the raising will be explained.

In the rolled position, the tarpaulin 12 is supported on the top rail 56 and the first arm 40 and second arm 46 are both in the upper position. The control means 100 at the pivot end 44 of the first arm 40 is engaged by the operator. If the manual mode is being used, the crank shaft 102 is released by unlocking the locking mechanism 120 and the handle 104 is rotated in order to impart rotation to the chain drive wheel 106 thus rotating the chain 108. This imparts rotation to the roller 52 by means of the spindle 54 and the chain wheel 90 at the tarp end of the first arm 40. This rotation causes rotation of the spindle 54 at the tarp end 48 of the second arm 46, such that the rotation of the handle 104 causes the roller to begin unrolling the tarpaulin 12.

Figure 2:
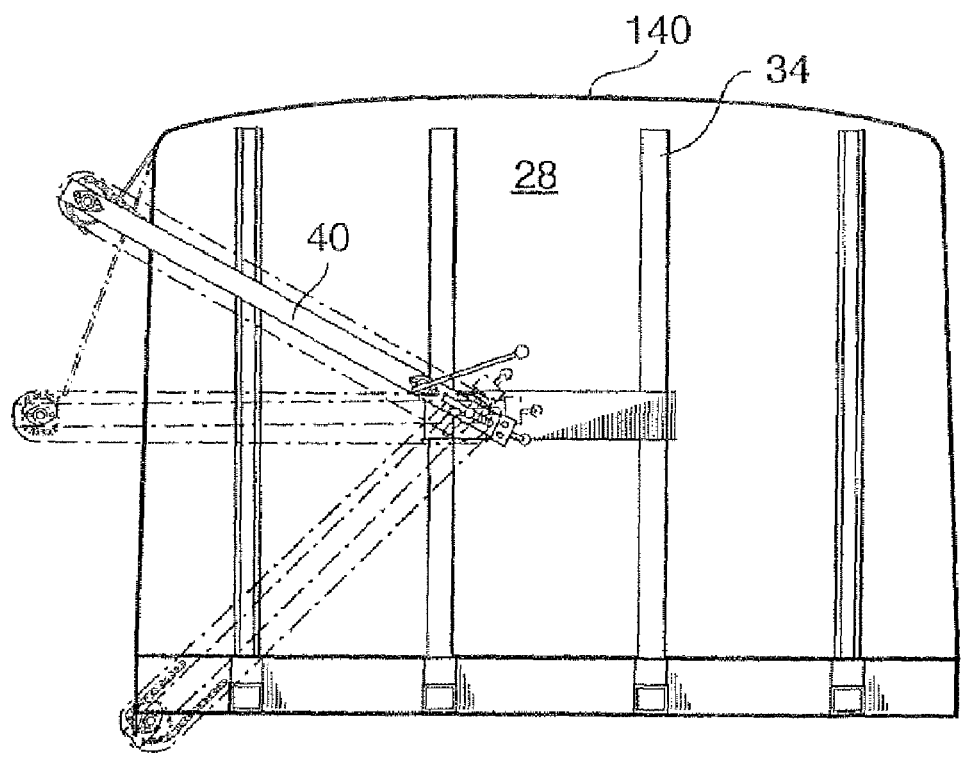
FIG. 2 is an elevation view of the front bulkhead with the arm of the invention mounted thereto.

As seen, partially in phantom in FIGS. 2 and 3, as the tarpaulin 12 is unrolled it begins to lower to cover the side 24 of the trailer 14. As the tarpaulin 12 is lowered the arms 40, 46 begin to move in a plane parallel to the plane of the bulkheads 28, 30 through a range from the upper to the lower positions. Since the arms 40, 46 are rigid and of fixed length, the rotation of the arms is translated to a longitudinal movement of the arm lateral to the plane of the bulkheads 28, 30 characterized by the movement of the slot longitudinally relative to the pivot shaft 96, in a cam like fashion. The first arm 40 is moved from its upper to lower position. In a slave arrangement, the second arm 46 follows the same movement.

At any point during the movement, the lowering of the tarpaulin 12 can be arrested by engaging the locking mechanism 120. During downward movement, the pawl 124 will not engage the teeth 126 unless the direction of the paw 124 is manually switched to a locking position in which position the pawl 124 is oppositely facing so as to abut one of the teeth 126 to prevent further rotation. This is to be distinguished from the raising movement in which the pawl 124 travels over the teeth 126 in such a way as to automatically engage the teeth 126 to prevent rotation in the opposite (namely downward) direction should rotation of the wheel stop.

Once the tarpaulin 12 has been fully rolled out and the side 24 has been covered, the spring 98 urges the arms 40, 46 to slide upward thus forcing the bottom of the tarpaulin 12 up under the flange 19 into a locked position for transport. Further securing means such as tie downs and clamps that are common in the industry can be used.

To begin to roll the tarpaulin 12 to raise it, the biasing of the spring 98 is overcome to allow the end of the tarpaulin 12 to clear the flange 19 and then the rotation of the roller 52 is effected in much the same way as when the tarpaulin 12 was lowered.

Although the system 10 has been illustrated with a tarpaulin 12 extending over the side 24 of the trailer 14, it will be understood that the system could comprise tarpaulins that when rolled are located at the centre of the top of the trailer in such a way that when unrolled in opposite directions, the tarpaulins not only cover the sides 24, 26 of the trailer 14 but also define the roof covering 140. In such a system, the tarpaulins would each have a pair of arms and drive system in a manner as described but the arms may be manufactured longer to accommodate the increased range of movement as the tarpaulin is rolled and unrolled. Similarly, it is contemplated to have a configuration in which one side 24 is covered and uncovered by a tarpaulin in the manner described herein and a second tarpaulin the is sized to cover and uncover the other side 26 and define the roof covering 140.

Although the present invention has been described by way of a detailed description in which various embodiments and aspects of the invention have been described, it will be seen by one skilled in the art that the full scope of this invention is not limited to the examples presented herein. The invention has a scope which is commensurate with the claims of this patent specification including any elements or aspects which would be seen to be equivalent to those set out in the accompanying claims.

The invention claimed is:

1. A side lifting/closing tarpaulin system for a flatbed trailer, the trailer having an elongated platform having front and rear ends, sides, a front bulkhead and a rear bulkhead, the front bulkhead and rear bulkhead extending upwardly from the platform at respective front and rear ends, and a plurality of tarpaulin supporting beams extending laterally across the platform, and longitudinally along the platform, the system comprising:

a pivoting front arm and a corresponding pivoting rear arm, each of the front and rear arms supported by the corresponding front and rear bulkhead, the front and rear arms pivotable, in corresponding fashion, with respect to a side of the platform, between an upper, open orientation and a lower, closed orientation, each front and rear arm pivotable in a plane parallel to that of the corresponding front and rear bulkhead about a pivot mounted to said front or rear bulkhead, a intermediate portion of the rear arm being bent from the plane parallel to the rear bulkhead;

a roller bar extending between and supported by an outer end of each of said front and rear arms;

the tarpaulin supported in rolled fashion on the roller bar when the arms are in upper, open orientation, opening the corresponding side of a trailer and being supported by the support beams, and being rolled off the bar and enclosing the corresponding side when the arms are in lower, closed position;

each front and rear arm provided with an elongated slot along a longitudinal axis of the arm, said front and rear arms mounted relative to said respective front and rear bulkheads such that said pivot sits within said slot in a manner that permits longitudinal movement of the arm relative to said pivot;

mechanical drive means to rotate said roller to roll or unroll said tarpaulin thus causing movement of the arms between said open and closed positions; and a locking mechanism to selectively lock or unlock the drive means during rotation of the roller.

2. The system of claim 1 wherein said drive means comprises a manual control associated with said front arm.

3. The system of claim 2 wherein said manual control comprises a crank shaft operationally connected to a chain in order to impart rotation to said roller.

4. The system of claim 1 further comprising a biasing means to urge the unrolled tarpaulin into a locked position relative to a bottom of said platform while said front and rear arms are in said lower closed position.

5. The system of claim 4 wherein said biasing means comprises a spring.

6. The system of claim 1 wherein said drive means is a chain drive associated with said front arm.

7. The system of claim 1 further comprising a second tarpaulin, a second pair of front and rear arms and second drive means to cover the opposite facing side of the trailer.

8. The system of claim 1 wherein said front and rear arms are rigid and of fixed length.

9. The system of claim 1 wherein at least one of the plurality of tarpaulin supporting beams comprises a telescoping top rail.

* * * * *